United States Patent

[11] 3,549,889

[72] Inventor Hideaki Akiyama
       Yokohama-shi, Japan
[21] Appl. No. 743,496
[22] Filed July 9, 1968
[45] Patented Dec. 22, 1970
[73] Assignee Kabushiki Kaisha Ricoh
       Tokyo, Japan
       a corporation of Japan
[32] Priority July 18, 1967
[33] Japan
[31] No. 42/46193

[54] AUTOMATIC FOCUSING DEVICE USING THE DIFFERENTIAL COMPARISON METHOD
8 Claims, 4 Drawing Figs.
[52] U.S. Cl. .................................................. 250/201,
       250/233, 250/234, 356/123
[51] Int. Cl. ..................................................... G01d 5/36,
       G01j 1/20; H01j 39/12
[50] Field of Search .......................................... 250/201,
       233, 234; 356/123

[56] References Cited
UNITED STATES PATENTS
2,831,057  4/1958  Orthuber ...................... 250/201X
2,838,600  6/1958  Salinger ....................... 250/201X
3,218,909  11/1965 Fain ............................. 250/211X Primary Examiner—James W. Lawrence
Assistant Examiner—C. R. Campbell
Attorney—Burgess, Ryan and Hicks ABSTRACT: An automatic focusing device comprising a lens system, a shutter disc disposed in front of said lens system and having an aperture located eccentrically of the optical axis of said lens system; light reception means comprising photoelectric elements, said means being disposed at a position of the focus of said lens system; and control means for controlling said lens system so as to stop its axial movement when the image of an object is focused upon said light reception means through said aperture. When the image of the object is not focused upon the light reception means, the image rotates with respect to said means in response to the helicoidal movement or displacement of said aperture with respect to said lens system, but when the image is sharply focused, the lens system is stopped. When the image on the light reception means is stationary, the variation of a electric current passing through or being generated by the light reception means becomes minimum, whereby said control means is actuated.

PATENTED DEC 22 1970

3,549,889

INVENTOR
HIDEAKI AKIYAMA

BY Burgess, Ryan & Hicks
ATTORNEYS

AUTOMATIC FOCUSING DEVICE USING THE DIFFERENTIAL COMPARISON METHOD

BACKGROUND OF THE INVENTION

The present invention relates to an automatic focusing device and more particularly to a novel automatic focusing system for use in a camera or the like.

A device for automatic focusing has long been desired and there have been proposed many devices or systems. But so far no satisfactory means has been proposed for automatic focusing. The conventional automatic focusing devices are very complicated in their constructions and too much expensive to manufacture so that they are not suited for practical purposes.

SUMMARY OF THE INVENTION

The present invention is based upon the principle or fact that light beams emitted or radiated from one spot of an object are focused as one spot on a focal plane whichever optical paths of a lens system the light beams have passed through.

When a shutter disc having an aperture located eccentrically of the optical axis of a lens system is disposed between the lens system and an object and is rotated, the image upon the focal plane of the lens system rotates when the image is not sharply focused while the image is held stationary when maximum sharpness is obtained. Therefore, it will be understood that when light reception means is disposed at a position where the image of an object is to be focused, it can be detected whether focusing has been accomplished or not by the variation in the amount of which is received by the light reception means.

Depending upon the positions of the image, AC (alternate electric current) and DC (direct electric current) flow through or are generated by the light reception means. When the image is not focused upon the light reception means, that is, when the image is rotating, the AC components exceed the DC components. On the other hand, when the image is so focused, and is therefore stationary, the AC components are less than the DC components. Therefore, when the ratio of AC to DC reaches a predetermined value or becomes less than the predetermined value, the lens system which has been moving in the axial direction thereof is stopped, whereby the automatic focusing of the lens system is effected.

According to the present invention, therefore, a shutter disc (referred to as "focusing disc" hereinafter) having a small aperture located eccentrically of the optical axis of a lens system is disposed in front of the lens system, and this focusing disc is constantly rotated with respect to the lens system about the optical axis thereof, while the lens system itself is reciprocated along said optical axis within a predetermined range by means of any suitable driving means. At the image plane of the above lens system where it is desired that a properly focused image be formed is disposed a light reception means consisting of photoelectric elements so as to receive the light beams from an object passing through the small aperture. A means for controlling the movement of the lens system is adapted to separate or discriminate AC and DC components which flow or are generated in the light reception means so that when the ratio of AC to DC becomes less than a predetermined value, the axial movement of the lens system is stopped.

Although the small aperture has been described as being rotated with respect to the lens system, which is held stationary, it will be apparent that any method which permits the relative helicoidal movement between the small aperture and the lens system may be employed in the present invention.

One of the objects of the present invention is to provide a novel automatic focusing system which has been never known or attempted in the prior art.

Other objects, features and advantages of the present invention will be clearly understood from the following description with reference to the accompanying drawings.

DESCRIPTION OF THE PREFERRED EMBODIMENT

Figure 1:
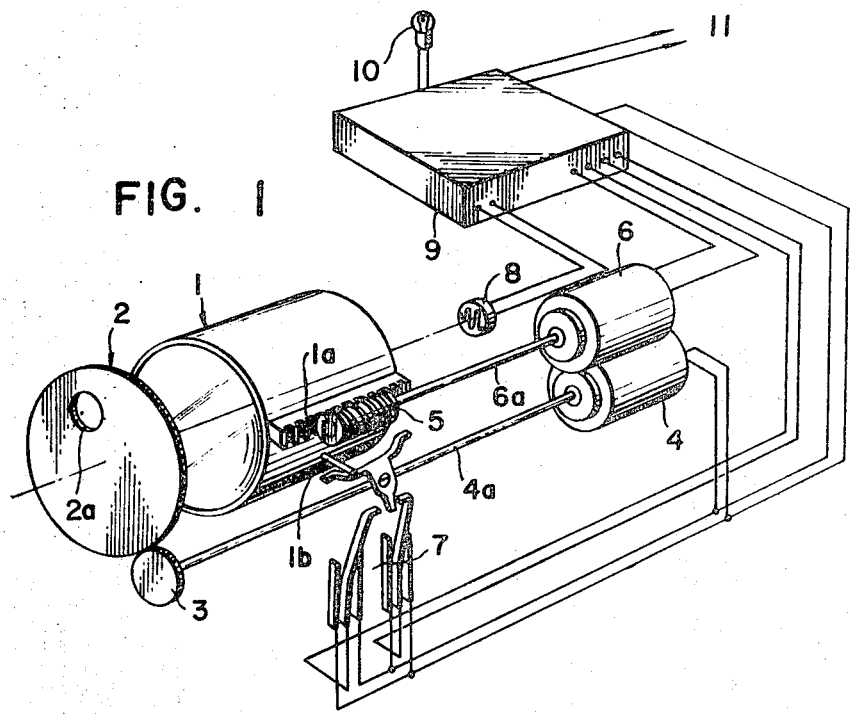
FIG. 1 is a perspective view of one preferred embodiment of an automatic focusing device of the present invention.

Now referring to FIG. 1, in front of a lens system 1 is disposed a focusing disc 2 rotatable with respect to the optical axis of the lens system 1, the focusing disc 2 having an aperture 2a located eccentrically of the optical axis of the lens system 1. The outer periphery of the focusing disc 2 is provided with teeth so that the focusing disc 2 may be in mesh with a toothed wheel 3 which in turn is carried by a rotary shaft 4a of a motor 4, whereby the focusing disc 2 may be rotated at a predetermined constant speed. At the outer surface of the lens system 1 is secured a rack 1a having obliquely-shaped teeth and being in mesh with a worm 5 which in turn is carried by a rotary shaft 6a of a motor 6. At the outer surface of the lens system 1 is also disposed a pin 1b which engages with a selection switch 7 upon the advancement or retraction of the lens system 1 so that the selection switch 7 is switched, whereby the direction of rotation of the motor 6 can be changed, thereby permitting the lens system 1 to reciprocate automatically within a predetermined distance or range. A photocell member 8 comprising photoelectric elements such as CdS cell is disposed at the plane where it is desired that the image be focused (the image plane) so as to receive the light which passes through the aperture 2a of the focusing disc 2 through the lens system 1. The motors 4 and 6, the selection switch 7 and the photocell 8 are interconnected with lens system drive control means 9 as shown in FIG. 1, the control means 9 being connected to the power source through lead wires 11.

Figure 2:
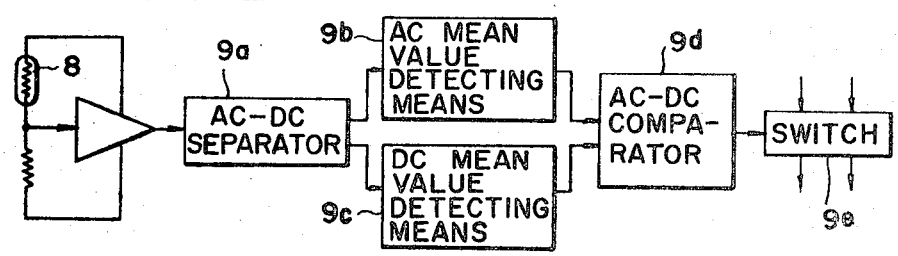
FIG. 2 is a block diagram of an electric circuit of a lens system drive controller.

The construction of the control means 9 will be described with reference to FIG. 2. AC and DC generated in the photocell 8 will be separated or discriminated into AC and DC components respectively as will be described in more detail hereinafter. The AC component is detected by an AC mean value detecting means 9b and the DC component by a DC mean value detecting means 9c, and the ratio of the AC component to the DC component is detected by an AC-DC comparator 9d. When the ratio reaches or falls below a predetermined value, the comparator 9d generates the signals which are transmitted to a switch 9e, whereby the switch 9e actuated, thereby stopping the rotation of the motor 6.

When the lens system 1 is directed to the subject to be photographed such as a person and at the same time the motors 4 and 6 are actuated, the focusing disc 2 starts to rotate and at the same time the lens system 1 makes a reciprocal motion.

Figure 3:
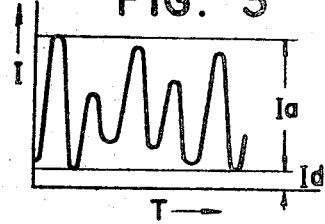
FIG. 3 and 4 are graphs showing the variations of the current flowing through a photocell.
Figure 4:
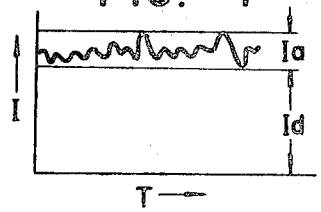

When the lens system 1 is not focused on the subject, the image thereof incident upon the photocell 8 rotates so that the brightness or quantity of light incident upon the photocell 8 is not constant. Therefore, the AC components in the electric current produced in the photocell 8 predominate as shown by $Ia$ in FIG. 3 while the DC component $Id$ is of lesser magnitude. When during displacement of the lens system 1 the subject is sharply focused, the rotation of the image incident upon the photocell 8 becomes less so that the AC component $Ia$ is reduced while the DC component $Id$ is increased. When the lens system 1 is correctly focused at the subject, then the image of the subject incident upon the photocell is held stationary so that the ratio of $Ia/Id$ becomes the minimum. When this ratio is within the range of 0.1 to 0, the current comparator 9d in the control means 9 generates the signals which are applied to the switch 9e, which is actuated thereby so that the lens system 1 is stopped at a position where the image of the subject is most sharply focused. Thus, the focusing operation is accomplished. When the lens system 1 is directed to another subject not equally distant with the first subject, the AC component generated in the photocell 8 is increased so that the ratio of Ia/Id is increased. Therefore, the comparator 9d generates the signals again which are applied to the switch 9e, whereby the motor is actuated again, thereby starting the reciprocal motion of the lens system 1. The movements of the lens system 1 will be stopped when the most sharp image is obtained on photocell 8.

It is desirable that the area of the image obtained at the photocell 8 is more than 90 percent of the overall effective area of the photocell in order to obtain sharp focusing. The reason is that it is necessary for sharp focusing to stop the motion of the lens system when the ratio of Ia/Id is as small as possible. Therefore, the light incident upon the photocell 8 must be not all the light passing through the lens system 1 from the scene being photographed, but only that a part thereof which is predominantly from the subject which is to be in focus. That is, the light from the essential portion of the subject must be incident upon the photocell 8. In this sense, the above photometry is a spot photometry so that it is desired that the area upon which the lights are incident be as small as possible. This is also one of the most essential factors for obtaining maximum sharpness of the image. In view of the above, it is preferable to provide a reference or datum point corresponding to the position of the photocell 8 in the field of vision through the viewfinder of the camera.

Many modifications and variations of the above described mechanism for driving the lens system 1 and the focusing disc 2 may be suggested, but any mechanism which can achieve the same effect obtained by the mechanism described hereinbefore may be employed. Furthermore, a pilot lamp 10 may be provided in the lens system drive control means 9 so as to facilitate the indication of the completion of focusing to an operator immediately before or simultaneously when the lens system 1 is stopped.

It will be apparent that the photographic objective is to be moved together with the lens system and stopped simultaneously when the lens system 1 is stopped so as to focus the image upon a film or the like. If it is desired to use the lens system 1 as the photographic object the camera may be so designed that the focusing disc 2 and the photocell 8 are pulled or retracted out of the light path when a picture is taken.

Although in the embodiment described hereinbefore the focusing plate 2 has been described as being rotated with respect to the lens system 1, the same result can be obtained by holding the focusing disc 2 stationary while rotating the lens system 1 along a spiral path about the axis of the light beam to be detected and moving simultaneously the lens system along said axis.

It is also possible to accomplish the automatic focusing according to the present invention by moving a film or the like in cooperation with the lens system 1.

The foregoing description is merely an illustration of a preferred embodiment of the invention and is not intended to limit the invention to this illustrative embodiment only.

I claim:

1. A device for focusing an image of an object on a desired image plane comprising:
  a. a lens system having an optical axis passing through the image plane, said lens system being movable along the optical axis between two limiting positions so chosen that at some position between said limiting positions the image formed by the lens system is focused on the image plane;
  b. adjusting means operable, when activated, for moving the lens system in reciprocating motion back and forth between the limiting positions;
  c. current-producing means for producing an electric current varying in intensity in accordance with variation in the quantity of light reaching a specific portion of the image plane, said specific portion being a fractional part only of the portion of the image plane which is illuminated by light transmitted by the lens system;
  d. control means for measuring and comparing the AC and the DC components of the electric current and for inactivating the adjusting means when the ratio of the AC component to the DC component drops below a predetermined value; and
  e. shielding means for rhythmically varying the fraction of the total light flux passing through the lens system on a given side of an imaginary diameter drawn through the optical axis of the lens system.

2. The device of claim 1 wherein the current-producing means comprises a photocell having a light-sensitive surface located in the image plane.

3. The device of claim 1 wherein the shielding means comprises a rotatable shutter having an axis of rotation coincident with the optical axis and having shielding portions opaque to light asymmetrically placed about said optical axis, said shielding portions lying in and blocking the path of light rays from the object to the image plane.

4. The device of claim 3 wherein the shielding means comprises an opaque disc pierced by an offcenter hole.

5. A device for focusing an image of an object on a desired image plane comprising:
  a. a lens system having an optical axis passing through the image plane, said lens system being movable along the optical axis between two limiting positions so chosen that at some position between said limiting positions the image formed by the lens system is focused on the image plane;
  b. a reversible electric motor;
  c. means for connecting the electric motor to the lens system to drive said system between the limiting positions in response to the rotation of the electric motor, reversal of the motor reversing the direction of travel of the lens system;
  d. a photocell having a light-sensitive surface bounded by borders in the image plane, said borders enclosing an area less than that illuminated by light passing through the lens system, said photocell producing an electric current proportional to the light striking said light-sensitive surface;
  e. an AC mean value detecting means connected to the photocell for measuring the mean value of the AC component of the electric current produced by the photocell;
  f. a DC mean value detecting means connected to the photocell for measuring the mean value of the DC component of the electric current produced by the photocell;
  g. current comparator means connected in signal-receiving relationship to the AC mean value detecting means and to the DC mean value detecting means for measuring the ratio of the mean values of the AC component to the DC component of the electric current produced by the photocell and for generating a switch-operating signal when said ratio drops below a predetermined amount;
  h. switch means connected in signal-receiving relationship to the current comparator means for stopping the electric motor when a switch-operating signal is received from said current comparator means;
  i. reversing means for reversing the direction of rotation of the electric motor when the lens system reaches a limiting position and thereby reversing the direction of movement of the lens system;
  j. light control means in the light path which extends between the object and the image plane through the lens system for producing a light flux from the object to the image thereof in the image plane which is asymmetric with respect to the optical axis of the lens system, more light reaching the image plane from one side of said optical axis than from the other and for rhythmically varying the direction from which the light flux approaches the image plane after passing through the lens system.

6. The device of claim 5 wherein the light control means comprises a shutter which is asymmetric with respect to the optical axis and rotatable thereabout.

7. The device of claim 6 wherein the shutter is a flat sheetlike member having an opening asymmetrically placed with respect to the optical axis.

8. A method of focusing the image of an object on a desired image plane through a lens system which comprises the steps of:
   a. locating a light-sensitive transducer at the image plane, said transducer having means to produce an electric current proportional to the light flux falling thereon;
   b. projecting an out-of-focus image of the object through the lens system on to the light-sensitive transducer;
   c. varying the position of the out-of-focus image relative to the transducer in a rhythmic fashion by rhythmically occluding and reopening light paths through the lens system which are asymmetrically located relative to the optical axis of the lens system, and thereby causing a variation in the electric current produced by the transducer; and
   d. measuring the ratio of the AC component to the DC component of the electric current produced by the transducer and moving the lens system axially until said ratio falls below a predetermined value.